March 1, 1966  W. E. KEMP  3,237,812
APPARATUS FOR HANDLING BULK MATERIALS
Filed April 30, 1964

INVENTOR.
WILLARD E. KEMP
BY
AGENT

United States Patent Office 3,237,812
Patented Mar. 1, 1966

3,237,812
APPARATUS FOR HANDLING BULK MATERIALS
Willard E. Kemp, Bridgeton, Mo., assignor to ACF Industries, Incorporated, New York, N.Y., a corporation of New Jersey
Filed Apr. 30, 1964, Ser. No. 363,809
12 Claims. (Cl. 222—189)

This invention relates to apparatus for handling bulk materials such as granular and pulverulent materials and more particularly to a permeable structure for such apparatus forming at least a portion of the wall of a plenum chamber through which gas under pressure passes from the plenum chamber into particles supported on the permeable structure. This application is a continuation-in-part of the joint application of Dallas W. Rollins and Willard E. Kemp, Serial No. 349,538, filed March 3, 1964, and entitled Hopper Structure.

Heretofore, in apparatus for handling materials pneumatically and having a plenum chamber, the wall of the plenum chamber on which particles to be unloaded are at least partially supported has been gas permeable to permit gas from the plenum chamber to pass through the permeable wall or member into the material supported on the surface of the permeable member.

The most important property in regard to the pneumatic handling of particles is particle size, and particularly the range of particle size. As is well known, a material containing particles all of which are substantially the same size, is difficult to fluidize or aerate and will not be handled efficiently. It is desirable for best results to have a substantial spread in the size range of the particles. The introduction of a gas in appropriate quantities into particles of suitable particle size ranges by diffusion will result in a substantial change in properties, and the gas-solids mixture will possess many of the properties of a fluid permitting the particles to be easily removed. Individual particles will be separated from each other, the bulk volume considerably expanded, and the internal particle-to-particle friction reduced to a minimum. The permeable member or wall, heretofore, has been formed at least in part of a fabric of fibrous sheet or membrane. When the permeable sheet has a relatively large surface area on which the particles to be unloaded are supported, it is necessary to provide support or strength for the sheet. Additionally, gas under pressure in the plenum chamber tends to bulge the permeable sheet upwardly by reason of the pressure differential on its opposite faces. The support heretofore has comprised a generally rigid perforated plate or base with the fabric or fibrous sheet secured to the base only around the marginal portions of the sheet, such as by spot welding or clamping of the edges of the sheet. This arrangement does not provide an integral load carrying member and does not prevent the fibrous sheet from bulging outwardly of the plenum chamber upon gas passing from the plenum chamber at a substantial pressure differential on opposite faces of the sheet.

It is an object of the present invention to provide a novel permeable member for a plenum chamber for handling pulverulent materials which has a relatively large surface area on which particles to be unloaded pneumatically are at least partially supported.

A further object of this invention is the provision of such a permeable member which is a load bearing structural member and acts as an integral structure when subjected to loads.

An additional object of the invention is the provision of such a novel permeable member which has a relatively smooth material supporting surface with small pore or void sizes providing flow passages having tortuous paths thereby to minimize clogging or plugging of the pores and to provide a surface which may be easily cleaned with water or a suitable solvent without any appreciable deterioration to the permeable member.

A further object is the provision of a permeable wall structure in which the uniformity of gas flow through the structure is not primarily dependent on the permeability of the porous sheet forming a portion of the permeable structure.

Briefly described, the present invention comprises a fluid-permeable load bearing structural member for a wall of a plenum chamber and including a permeable sheeet having two parallel faces with one of the faces forming a material supporting surface, and a perforated substantially rigid plate coextensive with and adjacent the other of the faces of the sheet, the thickness of the plate relative to its planar dimension being great enough to support the particles without substantial deflection, the sheet and the plate being secured to each other along substantially their entire facing surfaces to form an integrally bonded rigid sandwich, the permeable sheet having a relatively smooth and hard material supporting surface which may be easily cleaned and which has relatively small pore sizes to minimize the penetration of the material supporting surface by the particles being unloaded.

The invention accordingly comprises the constructions hereinafter described, the scope of the invention being indicated in the following claims.

In the accompanying drawings, in which several of various possible embodiments of the invention are illustrated:

Corresponding reference characters indicate corresponding parts throughout the several views of the drawings.

Figure 1:
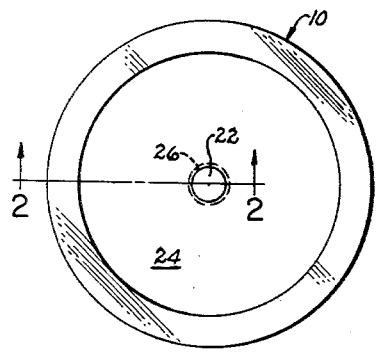
FIGURE 1 is a top plan of an embodiment of apparatus for handling bulk materials having a plenum chamber in which the permeable member of the present invention forms a wall of the plenum chamber.
Figure 2:
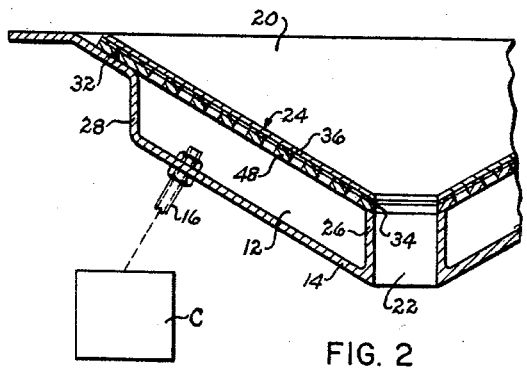
FIGURE 2 is a section taken generally along the line 2—2 of FIGURE 1 and showing the plenum chamber with the permeable member forming a wall thereof, the upper surface of the permeable member forming a material supporting surface.
Figure 3:
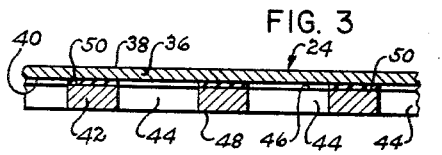
FIGURE 3 is an enlarged fragment of FIGURE 2 showing a section of the permeable member.

Referring to the drawings, and particularly to the embodiment of FIGURES 1-4, apparatus for handling finely-divided material, such as granular and pulverulent material, is generally designated 10. A plenum chamber 12 has a bottom wall 14 and a fluid conduit 16 is connected to a suitable source of gas, such as an air compressor indicated at C in FIGURE 2, to supply gas under pressure to plenum chamber 12. Material or lading to be unloaded enters the upper or inlet end 20 of structure 10 and is discharged through opening 22 which forms the outlet end of structure 10.

Forming the upper wall of plenum chamber 12 is a permeable member generally designated 24 which spans the distance between side walls 26 and 28 of plenum chamber 12. An upper portion of side wall 28 is flared to form an upper support surface 32. Side wall 26 has an upper support surface 34. Permeable member 24 includes an upper permeable sheet 36 having generally parallel faces 38 and 40. Upper face 38 forms a material supporting surface, the material to be unloaded being supported on face 38 and moving therealong to outlet 20. Sheet or membrane 36 is formed of a fiber metal material in which metallic fibers, such as stainless steel fibers, having a length to diameter ratio of at least 10 to 1, and as high as 2,000 to 1, are individually dispersed and felted to form a random, interlocked nonwoven body. The nonwoven body is then sintered under reducing conditions at a high temperature to produce welds or metallic diffusion bonds at interfiber contact points. A suitable material for sheet 36 is manufactured and sold under the name Feltmetal by Huyck Metals Division of Huyck Corporation, 45 Woodmont Road, Milford, Connecticut.

The porosity of a porous medium is expressed as a percent of the void volume of porous space to the total volume of the medium. Void or pore volumes are usually determined by measuring the amount of liquid needed to saturate the dry medium. Sheet 36 may have a pore size of a maximum not substantially exceeding 40 microns with 80 percent of the pores within the range between 6 and 28 microns and an average pore size of around 15 microns. The porosity or percentage of voids is 70 percent to give sheet 36 a solid content of around 30 percent. A thickness of sheet 36 of around $\frac{1}{16}$ inch and of a maximum not substantially exceeding $\frac{1}{8}$ inch has been found satisfactory for handling pulverulent materials, such as cement and flour. If the pore size of sheet 36 is decreased, a higher solid content would result which would permit a thinner sheet.

Membrane or sheet 36 has small pore sizes arranged in a tortuous path through the sheet. The path of the gas passing through the permeable sheet is also tortuous and any particles which tend to fill the pores must follow the tortuous path. If the average pore size is around 15 microns, particles having a maximum dimension less than 15 microns may tend to enter the pores. Even though the smaller sizes of particles do enter the pores, there is a tendency of the particles to penetrate membrane 36 to a minimum depth as the path is tortuous. The particles do not easily negotiate the bends or turns in the tortuous path and tend to collect at the first bend or turn which is usually closely adjacent the material supporting surface. Thus, since the particles penetrate membrane 36 only to a minimum extent, the particles may be removed to a substantial extent by brushing of the material supporting surface. The gas passing through sheet 36 also tends to blow out the particles which have lodged in the pores. The small pore size of sheet 36 and the tortuous flow passages minimize the clogging of the pores with the material to be unloaded, such as cement.

Metallic sheet 36 is nonabsorbent and has a relatively smooth and dense supporting surface 38 while being substantially rigid. This permits sheet 36 to be easily cleaned, such as for example, by brushing, by water, or by a suitable solvent for the material being unloaded. In the event cement is being unloaded phosphoric or nitric acid is a suitable solvent for cleaning sheet 36 and may simply be poured onto the material supporting surface of sheet 36 for draining through the sheet. For flour, a detergent, such as soapy water, may be satisfactorily employed for cleaning sheet 36.

Permeable member 24 has a relatively large unsupported dimension between side walls 26, 28. The weight of the material to be unloaded, such as, for example, the lading within a railway hopper car is oftentimes relatively large and forms a substantial dead load on the permeable member during transit. At times, it is desirable for workmen to be supported on permeable member 26, such as during a cleaning or repair operation. Thus, permeable member 24 should be substantially rigid and an integral load carrying structural member for best results.

To accomplish the foregoing, a rigid perforated plate or base 42 is secured to sheet 36 and is generally coextensive with sheet 36. Perforations 46 extend through plate 42 and comprise around 60 percent of the entire surface area of the plate. It is desirable to have as much of the surface area of plate 42 perforated as possible thereby to permit increased diffusion of gas through sheet 36. If over around 60 percent of the area of plate 42 is perforated, the supporting strength of the base is reduced to an undesirable level. Plate 42 may be formed of a high strength steel or of other materials having a sufficient supporting strength for sheet 36, such as a suitable plastic.

To secure sheet 36 and plate 42 to each other to form an integral structural load carrying member, it is necessary that sheet 36 and plate 42 be secured to each other along substantially their entire facing surfaces. Plate 42 has an upper surface or face 46 adjacent sheet 36 and a lower face 48 adjacent plenum chamber 12. A suitable adhesive 50 is first disposed on face 46 and sheet 36 is then positioned on face 46. The area of surface 40 immediately adjacent perforations 44 is substantially free of adhesive and thus does not impede the passage of gas through sheet 36. An adhesive which has been found to be satisfactory for bonding sheet 36 to plate 42 is adhesive EC-2214 produced by Minnesota Mining and Manufacturing Company, Adhesives, Coatings and Sealers Division, 900 Bush Avenue, St. Paul 6, Minnesota. Adhesive EC-2214 is a one hundred percent solids, thermosetting liquid adhesive having high strength properties at service temperatures from —70° F. to 200° F. The adhesive has an epoxy resin base and may be applied by a knife coating, spatula, or trowel.

To bond sheet 36 and plate 42, the adhesive is first spread over face 46. Then, sheet 36 is placed on face 46 and a pressure of 25 p.s.i. is applied. The temperature is next increased to 250° F. and composite member 24 is cured for forty minutes at 250° F. Permeable member 24 is then cooled to at least 200° F. before the pressure is released. To secure permeable member 24 in position, surface 48 may be welded to surfaces 32 and 34 to form plenum chamber 12.

While sheet 36 has been secured to plate 42 by an adhesive, it is to be understood that other suitable securing means may be employed, such as, for example, a sintered bonding of metallic sheet 36 to plate 42.

The permeability of a porous medium is a measure of the ease with which a fluid will pass through the medium; the higher the permeability, the higher the flow rate for a given pressure gradient. The flow rate is dependent on the fluid conductivities of all the flow channels in the medium and is effected by the variations and size, shape, direction, and interconnections of all the flow channels. The resistance to the passage of gas through the porous medium may conveniently be expressed in terms of gas volume passing at a specified pressure drop across the medium. As employed in the specification and claims herein, the term "permeability" is defined as "the amount of air measured in cubic feet and at 70° F. and 25% relative humidity which will pass through the area of one square foot of permeable member 24 in one minute when tested under an equivalent pressure differential of 2 inches of water." A permeability of around 10 for member 24 has been found to be satisfactory for handling finely divided particles ranging in size between about 10 and 100 microns. This rating may be obtained by employing a metallic sheet 36 of around 1/16 of an inch in thickness having a solid content of around 30%, and a steel plate 42 of around 1/8 inch in thickness with apertures 44 including around 60% of the entire surface area of plate 42.

Air under pressure from air compressor C to plenum chamber 12 through conduit 16 provides an air pressure of around 5 p.s.i., which is adequate to effect an air flow into a compacted mass of material supported on surface 38 of permeable sheet 36. A permeability of around 10 results in a substantially equal distribution of an appropriate gas, such as air, throughout the length and width of plenum chamber 12 below the porous or permeable member 24 thus assuring the passage of a generally uniform and controlled volume of air into the particles to be unloaded. To give maximum results, the surface on which the material is supported should be inclined at an angle in excess of the angle of repose of the fluidized material being handled.

Figure 5:
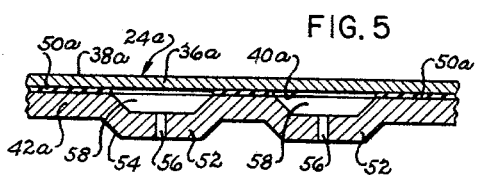
FIGURE 5 is a section of a separate embodiment of the permeable member in which the permeable member has a supporting plate which is dimpled to provide an increased control over the flow of gas from the plenum chamber.
Figure 4:
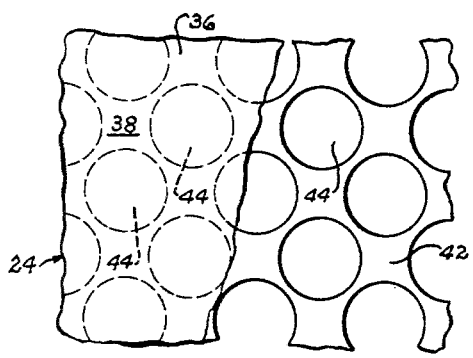
FIGURE 4 is a top plan of the permeable member of FIGURE 3, a portion of the upper permeable sheet being broken away.
Figure 6:
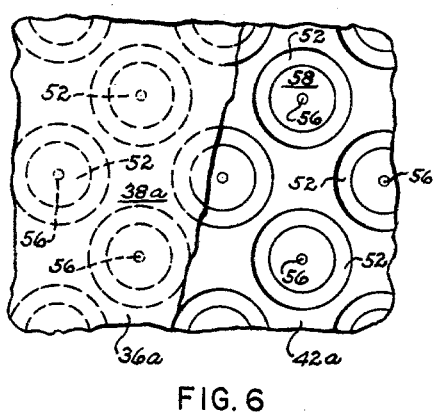
FIGURE 6 is a top plan of the permeable member illustrated in FIGURE 5, a portion of the upper permeable sheet being broken away.

Referring to FIGURES 5 and 6, another embodiment of a permeable member is illustrated and generally designated 24a. A substantially rigid metallic plate 42a has a plurality of generally uniformly spaced dimples 52 which comprise around 40% to 60% of the surface area of plate 42a. Dimples 52 strengthen and reinforce plate 42a against flexure under load conditions. Lower surface 54 of plate 42a is adjacent the plenum chamber and has an aperture or orifice 56 to each space 58 formed between the adjacent surface 40a of permeable sheet 36a and plate 52. Gas passing or flowing from the plenum chamber is restricted by the size of orifices 56 and the orifices may be employed to control the flow of gas from the plenum chamber. As an example, depressions or dimples 52 may be of a diameter of around 1" and orifices 56 may be of a diameter of around 1/16" to obtain satisfactory results. Permeable member 36a may be formed similarly to sheet 36 of the embodiment of FIGURES 1–4. The fluid pressure exerted against surface 40a of permeable sheet 36a from the plenum chamber may be suitably controlled by orifices 56 to minimize the tendency of permeable sheet 36a to tear away from plate 42a. Permeable sheet 36a may be bonded to plate 42a by adhesive 50a in a manner similar to the embodiment of FIGURES 1–4. By restricting the flow of gas through apertures 56 into the enlarged spaces 58, a generally uniform permeability is obtained along the entire material supporting surface 38a.

Figure 7:
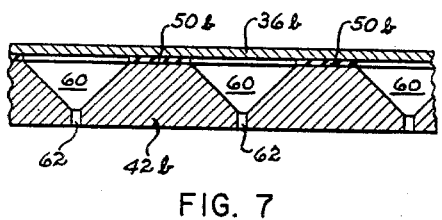
FIGURE 7 is a section of a further embodiment of the permeable member in which generally frusto-conical openings are provided through the supporting plate.

Referring to FIGURE 7, a further embodiment of a permeable structure is illustrated in which supporting plate 42b has a plurality of frusto-conically shaped openings 60 therethrough. A restricted orifice 62 leads to each opening 60. The gas flow from the plenum chamber is easily controlled by orifices 62. Permeable sheet 36b is bonded to plate 42b by adhesive 50b as in the embodiment of FIGURES 1–4 and FIGURES 5 and 6.

From the foregoing, the permeable member 24 forms an integral load bearing structural member comprising a permeable sheet 36 formed of a nonabsorbent generally rigid material and secured in face-to-face contact with a supporting perforated base 42 which provides a supporting strength for the permeable member 24. Cleaning of permeable member 24 is easily accomplished and clogging of the pores of permeable sheet 36 is minimized from the relatively small pore sizes and the tortuous flow passages through sheet 36.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for handling finely-divided particles comprising a fluid permeable load bearing structural member of a generally planar configuration and having a particle supporting surface, means forming with said fluid permeable member a plenum chamber adjacent the side of said fluid permeable member opposite the particle supporting surface, said fluid permeable member forming at least a part of a wall of said plenum chamber, means for introducing fluid within the plenum chamber, said fluid permeable member comprising a permeable sheet having two spaced parallel faces and one of said faces forming the particle supporting surface, a perforated substantially rigid plate generally coextensive with and adjacent the other of said faces of the sheet, the thickness of the plate relative to its planar dimension being great enough to support the particles without substantial deflection, and bonding means between substantially the entire facing surfaces of the plate and the sheet to form an integrally bonded generally rigid sandwich and to secure the plate and sheet to each other along substantially their entire facing surfaces, said permeable sheet having a void space with a substantial majority of the void sizes being of a size below 40 microns to minimize penetration of the particle supporting surface by finely-divided particles, said permeable sheet having a relatively hard and smooth particle supporting surface thereby to permit the particles to move easily along the surface and the surface to be easily cleaned.

2. Apparatus for handling finely-divided particles as set forth in claim 1 wherein the thickness of said sheet does not substantially exceed 1/8 inch, and said sheet has tortuous flow passages formed by the void space to minimize clogging of the flow passages.

3. Apparatus for handling finely-divided particles as set forth in claim 1 wherein said permeable sheet has a void space measured as the ratio between the volume of voids and the total volume of the sheet not substantially exceeding 50%, said void space being generally uniform throughout the entire volume of the permeable sheet to permit a generally uniform passage of fluid through the permeable sheet from the plenum chamber, said permeable sheet having tortuous flow passages formed by the void space to minimize clogging of the flow passages.

4. Apparatus for handling finely-divided particles as set forth in claim 1 wherein said sheet comprises a plurality of interlocked metal fibers bonded at their interfiber contact points and having a length to diameter ratio of at least ten to one, the fibers being randomly dispersed and compressed to form a sheet not substantially exceeding 1/8 inch.

5. Apparatus for handling finely-divided particles comprising a fluid permeable load bearing structural member of a generally planar configuration and having a particle supporting surface, means forming with said fluid permeable member a plenum chamber adjacent the side of said fluid permeable member opposite the particle supporting surface, said fluid permeable member forming at least a part of a wall of said plenum chamber, means for introducing fluid within the plenum chamber, said fluid permeable member comprising a permeable sheet having two spaced parallel faces and one of said faces forming the particle supporting surface, and a perforated substantially rigid plate generally coextensive with and adjacent the other of said faces of the sheet, the thickness of the plate relative to its planar dimension being great enough to support the particles without substantial deflection, said plate and said sheet being secured to each other to form an integrally bonded rigid sandwich, said permeable sheet having a void space with a substantial majority of the void sizes being of a size below 40 microns to minimize penetration of the particle supporting surface by finely-divided particles, said permeable sheet having a relatively hard and smooth particle supporting surface thereby to permit the particles to move easily along the surface and the surface to be easily cleaned, said substantially rigid plate having a plurality of generally uniform spaced dimples each of which forms an open space between the sheet and the plate, each dimple having an orifice communicating the open space thereof with the plenum chamber to control the passage of fluid from the plenum chamber.

6. Apparatus for handling finely-divided particles comprising a fluid permeable load bearing structural member of a generally planar configuration and having a particle supporting surface, means forming with said fluid permeable member a plenum chamber adjacent the side of said fluid permeable member opposite the particle supporting surface, said fluid permeable member forming at least a part of a wall of said plenum chamber, means for introducing fluid within the plenum chamber, said fluid permeable member comprising a permeable sheet having two spaced parallel faces and one of said faces forming the particle supporting surface, and a perforated substantially rigid plate generally coextensive with and adjacent the other of said faces of the sheet, the thickness of the plate relative to its planar dimension being great enough to support the particles without substantial deflection, said plate and said sheet being secured to each other to form an integrally bonded rigid sandwich, said permeable sheet comprising a plurality of interlocked metal fibers bonded at their interfiber contact points and having a length to diameter ratio of at least ten to one, the fibers being randomly dispersed and compressed to a thickness not substantially exceeding ⅛ inch, said permeable sheet having a relatively hard and smooth particle supporting surface thereby to permit the particles to move easily along the surface and the surface to be easily cleaned, said substantially rigid plate having a plurality of generally uniformly spaced dimples each of which forms an open space between the sheet and the plate, each dimple having an orifice communicating the open space thereof with the plenum chamber to control the passage of fluid from the plenum chamber.

7. Apparatus for handling finely-divided particles comprising a fluid permeable load bearing structural member of a generally planar configuration and having a particle supporting surface, means forming with said fluid permeable member a plenum chamber adjacent the side of said fluid permeable member opposite the particle supporting surface, said fluid permeable member forming at least a part of a wall of said plenum chamber, means for introducing fluid within the plenum chamber, said fluid permeable member comprising a permeable sheet having two spaced parallel faces and one of said faces forming the particle supporting surface, and a perforated substantially rigid plate generally coextensive with and adjacent the other of said faces of the sheet, the thickness of the plate relative to its planar dimension being great enough to support the particles without substantial deflection, a layer of thermosetting adhesive interposed between said plate and said sheet to secure the plate and sheet to each other and to form an integrally bonded rigid sandwich, said permeable sheet comprising a plurality of interlocked metal fibers bonded at their interfiber contact points and having a length to diameter ratio of at least ten to one, the fibers being randomly dispersed and compressed to a thickness not substantially exceeding ⅛ inch, said permeable sheet having a relatively hard and smooth particle supporting surface thereby to permit the particles to move easily along the surface and the surface to be easily cleaned.

8. A fluid-permeable load bearing structural member of generally planar configuration comprising a plurality of interlocked metal fibers bonded at their interfiber contact points and having a length to diameter ratio of at least ten to one, the fibers being randomly dispersed and compressed to form a sheet having two parallel faces spaced at a distance not substantially exceeding one-eighth of an inch, a perforated substantially rigid plate coextensive with and adjacent one of the faces of the sheet, the thickness of the plate relative to its planar dimension being great enough to support the load without substantial deflection, and bonding means between substantially the entire facing surfaces of the plate and the sheet to form an integrally bonded generally rigid sandwich and to secure the plate and sheet to each other along substantially their entire facing surfaces.

9. A fluid-permeable load bearing structural member of generally planar configuration comprising a plurality of interlocked metal fibers bonded at their interfiber contact points and having a length to diameter ratio of at least ten to one, the fibers being randomly dispersed and compressed to form a sheet having two parallel faces spaced at a distance not substantially exceeding one-eighth of an inch, a perforated substantially rigid plate coextensive with and adjacent one of the faces of the sheet, the thickness of the plate relative to its planar dimension being great enough to support the load without substantial deflection, and a layer of thermosetting adhesive interposed between the plate and the sheet to form an integrally bonded rigid sandwich and to secure the plate and sheet to each other along substantially their entire facing surfaces.

10. A fluid-permeable load bearing structural member of generally planar configuration comprising a plurality of interlocked metal fibers bonded at their interfiber contact points and having a length to diameter ratio of at least ten to one, the fibers being randomly dispersed and compressed to form a sheet having two parallel faces spaced at a distance not substantially exceeding one-eighth of an inch, a perforated substantially rigid plate coextensive with and adjacent one of the faces of the sheet, the thickness of the plate relative to its planar dimension being great enough to support the load without substantial deflection, said sheet and said plate being secured to each other along substantially their entire facing surfaces to form an integrally bonded rigid sandwich, said substantially rigid plate having a plurality of generally uniform spaced dimples each of which forms an open space between the sheet and the plate, each dimple having an orifice communicating the open space thereof with the plenum chamber to control the passage of fluid from the plenum chamber.

11. A fluid-permeable load bearing structural member as set forth in claim 8 wherein said permeable sheet has a void space measured as the ratio between the volume of voids and the total volume of the sheet of at least 50%, a substantial majority of the void sizes being of a size below 40 microns to minimize penetration of the permeable sheet by finely-divided particles.

12. Apparatus for handling finely-divided particles comprising a fluid permeable load bearing structural member of a generally planar configuration and having a particle supporting surface, means forming with the fluid permeable member a plenum chamber adjacent the side of said fluid permeable member opposite the particle supporting surface, said fluid permeable member forming at least a part of a wall of said plenum chamber, means for introducing fluid within the plenum chamber, said fluid permeable member comprising a permeable sheet having two spaced parallel faces and one of said faces forming the particle supporting surface, and a perforated substantially rigid plate coextensive with and adjacent the other of said faces of the sheet, the thickness of the plate relative to its planar dimension being great enough to support the particles without substantial deflection, bonding means interposed between substantially the entire facing surfaces of the plate and the sheet to form an integrally bonded rigid sandwich, said permeable sheet having a void space measured as the ratio between the volume of voids and the total volume of the sheet of at least 50%, a substantial majority of the void sizes forming the void space being below around 40 microns, said permeable sheet comprising a plurality of interlocked metal fibers bonded at their interfiber contact points and having a length to diameter ratio of at least ten to one, the fibers being randomly dispersed and compressed to a thickness not substantially exceeding ⅛ inch, said permeable sheet having tortuous flow passages formed by the void space to minimize clogging of the flow passages and having a smooth particle supporting surface to permit the particles to move easily along the surface.

References Cited by the Applicant

UNITED STATES PATENTS

| 2,400,719 | 5/1946 | Stackhouse | 55—527 |
| 2,589,968 | 3/1952 | Schemm | 222—195 X |
| 2,774,516 | 12/1956 | Jensen | 222—195 |
| 3,017,698 | 1/1962 | Hambrecht et al. | 55—526 X |

FOREIGN PATENTS 669,426  8/1963  Canada.

LOUIS J. DEMBO, *Primary Examiner.*